R. W. STEWART.
REAR TIRE HOLDER.
APPLICATION FILED AUG. 18, 1916.
1,207,811.
Patented Dec. 12, 1916.
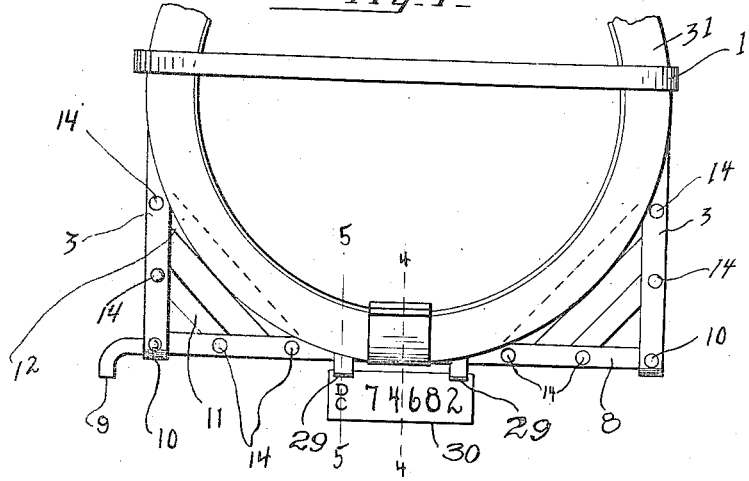
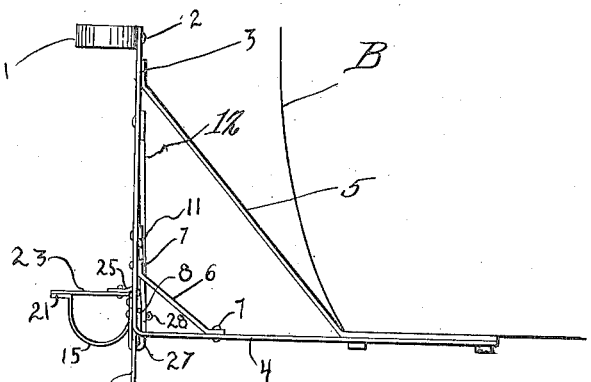
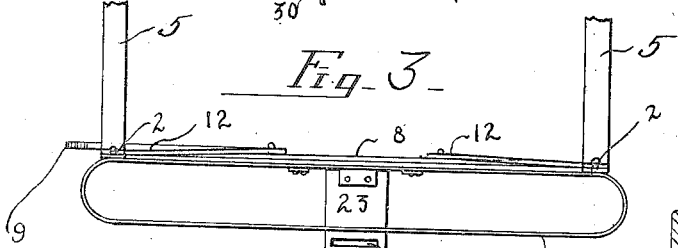
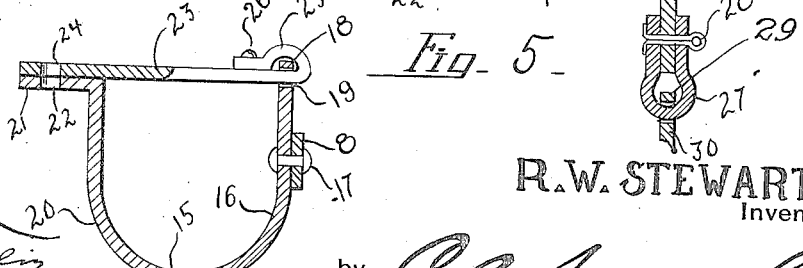
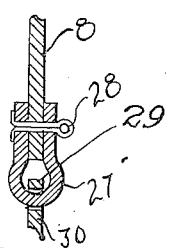
Witnesses
J. R. Tomlin
R. L. Parker
R. W. STEWART
Inventor
by C. A. Snow & Co.
Attorneys

UNITED STATES PATENT OFFICE.

ROSSIE W. STEWART, OF BURR OAK, KANSAS.

REAR-TIRE HOLDER.

1,207,811.   Specification of Letters Patent.   Patented Dec. 12, 1916.

Application filed August 18, 1916.   Serial No. 115,615.

*To all whom it may concern:*

Be it known that I, ROSSIE W. STEWART, a citizen of the United States, residing at Burr Oak, in the county of Jewell and State of Kansas, have invented a new and useful Rear-Tire Holder, of which the following is a specification.

The device forming the subject matter of this application is adapted to be assembled with the rear end of a vehicle, for holding an extra tire.

The invention aims to provide a structure of this kind which will be simple and strong in construction, and to provide novel means whereby the tire may be held in place.

Another object of the invention is to provide novel means for holding a lamp in place, the holding means for the lamp being so located that the tire will not be heated by the lamp.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention. In the accompanying drawings:—Figure 1 shows in rear elevation, a tire holder embodying the present invention; Fig. 2 is an end elevation of the tire holder; Fig. 3 is a top plan of the tire holder; Fig. 4 is a cross section on the line 4—4 of Fig. 1, parts being omitted; and Fig. 5 is a section on the line 5—5 of Fig. 1, parts being omitted.

In carrying out the present invention there is provided a horizontal loop 1 attached by means of securing elements 2 to the upper ends of vertical standards 3 extended at their lower ends to form horizontal arms 4 connected by braces 5 with the standards. The arms 4 and lower terminals of the braces 5 are bolted or otherwise secured to the bottom of the vehicle body B at the rear end thereof. The arms 4 and the braces 5, however, may be shaped in any desired manner, depending upon the form of the vehicle body wherewith the device forming the subject matter of this application is assembled.

The arms 4 are sustained by means of inclined braces 6 assisting braces 5, the upper ends of the braces 6 being secured to the standards 3, and the lower ends of the braces 6 being secured to the arms 4 by rivets 7 or other attaching elements employed for this purpose.

The numeral 8 designates a bottom bar attached by means of securing elements 10 to the standards 3, near to the lower ends thereof, the bottom bar 8 being horizontally disposed. At one end, the bottom bar 8 is prolonged beyond the adjacent standard 3 to form a depending holder 9 to which a lamp (not shown) may be secured. The standards 3 are connected with the bottom bar 8 by means of lower braces 11 and upper braces 12, the ends of the braces being secured, respectively, to the standards 3 and to the bottom bar 8 by means of attaching elements 14.

The numeral 15 designates a substantially U-shaped support embodying an arm 16 attached by one or more rivets 17, or like securing devices, to the rear face of the bottom bar 8, intermediate the ends of the bottom bar. The upper end of the arm 16 of the U-shaped support 15 projects above the upper edge of the bottom bar 8, as indicated at 18, and is provided with an opening 19. The U-shaped support 15 includes an arm 20, the upper end of which is bent rearwardly to form a substantially horizontal lip 21 provided with an opening 22.

The numeral 23 designates a latch having an opening 24 coöperating with the opening 22 in the lip 21, the openings 24 and 22 being adapted to receive a lock or fastening device (not shown). The forward end of the latch 23 terminates in a reduced tongue 25, passing through the opening 19 and bent upon itself to form an eye, the latch 23 being mounted in this manner, for vertical swinging movement. The free end of the tongue 25 is secured to the body portion of the latch 23 by means of a rivet or the like shown at 26.

The invention comprises a pair of U-shaped hangers 27 which straddle the lower edge of the bottom bar 8, as clearly shown in Fig. 5. The hangers 27 may be held removably on the bar 8 by means of cotter pins 28 or any other elements adapted for the ends in view. The hangers 27 are passed removably through openings 29 formed in a license tag 30, near the upper edge of the tag.

In practical operation, a tire 31 is slid downwardly within the contour of the loop 1 and rests on the support 15. The latch 23 is then swung over into the position of Figs. 2 and 4, and a locking device (not shown) is passed through the openings 24 and 22. In this manner, the tire is securely held in place, but may be removed at any time, by swinging the latch 23 to an open position.

The structure forming the subject matter of this application comprises few parts and, owing to the specific arrangement of these parts, it will be found to possess maximum strength with minimum weight.

Having thus described the invention, what is claimed is:—

1. In a device of the class described, a pair of standards provided at their lower ends with angularly extended vehicle-engaging means; a tire-holding loop connecting the standards adjacent the upper ends of the standards; a bottom bar connecting the standards adjacent the lower ends of the standards; and a tire support carried by the bottom bar intermediate the ends of the bottom bar.

2. A device of the class described comprising a tire-holding loop; a pair of standards having their upper ends connected with the loop, the standards being provided with vehicle-engaging means; a bottom bar connecting the standards adjacent their lower ends, one end of the bottom bar being extended to form a lamp holder; and a tire support carried by the bottom bar intermediate the ends of the bottom bar.

3. In a device of the class described, a tire holding loop; a pair of standards having their upper ends assembled with the loop, the standards being provided with vehicle engaging means; a bottom bar connecting the standards adjacent the lower ends of the standards; a tire support carried by the bottom bar, intermediate the ends of the bottom bar, the tire support being of U-shape; and a latch pivotally assembled at one end with the support, and coöperating at its other end with the support.

4. In a device of the class described, a tire-holding loop; a pair of standards assembled at their upper ends with the loop and provided at the rear ends with outstanding arms; braces connecting the arms of the standards with the body portions of the standards; a bottom bar connected with the standards adjacent the arms; braces connecting the standards with the bottom bar; and a tire support carried by the bottom bar and located intermediate the ends of the bottom bar.

In testimony that I claim the foregoing as my own, I have hereto affixed my signature in the presence of two witnesses.

ROSSIE W. STEWART.

Witnesses:
W. M. GREEN,
R. H. PARSONS.